Patented Mar. 15, 1938

2,111,029

UNITED STATES PATENT OFFICE 2,111,029

PRODUCTION OF COMPLEX METAL COMPOUNDS OF AZO DYESTUFFS

Friedrich Moll, Mannheim, and Fritz Lange, Ludwigshafen-on-the-Rhine, Germany, assignors to General Aniline Works, Inc., New York, N. Y., a corporation of Delaware No Drawing. Application February 4, 1936, Serial No. 62,380. Renewed September 16, 1937. In Germany February 15, 1935

13 Claims. (Cl. 260—12.2)

The present invention relates to the production of complex metal compounds of azo dyestuffs.

A process for the production of azo dyestuffs containing metals is described in our copending application for Letters Patent Ser. No. 27,816, filed June 21st, 1935, according to which metal compounds of azo dyestuffs containing the radicle of 1-hydroxynaphthalenes in which the azo group is present in the 2-position of the naphthalene nucleus are prepared by coupling diazo compounds of aromatic amines, which contain a hydroxyl, carboxylic or alkoxy group in ortho-position to the amino group, with 1-hydroxynaphthalene-4-sulphonic acid or its derivatives, or by coupling the diazo compounds of 1-hydroxy-2-aminonaphthalene-4-sulphonic acid or its derivatives with any compounds which contain a hydroxyl group and are capable of being coupled in the position adjacent to the said group, converting the dyestuffs resulting in either of the said methods into their complex metal compounds and then splitting off the sulphonic acid group from the 4-position of the naphthalene nucleus by treatment with acids or agents supplying acids.

We have now found that similarly valuable dyestuffs can be obtained by subjecting the metal-containing and in particular the chromium-containing azo dyestuffs derived from diazo compounds of 2-amino-1-phenol-4-sulphonic acids substituted in the 5-position and components which are capable of coupling in an ortho-position to a hydroxyl group to the treatment with acids or agents supplying acids thus splitting off of the sulphonic acid group. This treatment is preferably carried out with mineral acids having no oxidizing action, as for example sulphuric or hydrochloric acid, or strong organic acids, as for example chloracetic acid or trichloracetic acid. The temperature and duration of the reaction to be employed are to a great extent dependent on the concentration and the degree of dissociation of the acid employed, a decrease in the amount of acid necessitating an increase in the temperature. For example with an acid concentration of less than 1 per cent of free acid, temperatures of 150° C. or more must be employed.

The treatment with acids may be carried out on the complex chromium compounds of the dyestuffs after they have been separated or such separation may be dispensed with and the said treatment combined with the preparation of the metal compounds. If the complex chromium compound has been produced in acid solution, the splitting off may be effected by heating for longer periods, advantageously while raising the temperature and if desired while adding further amounts of acid. The complex chromium dyestuffs serving as initial materials may be prepared in any suitable manner, as for example by boiling the azo dyestuffs with an alkaline solution of sodium chromite or by heating the dyestuff, if desired under pressure, with solutions of suitable chromium salts, as for example chromium fluoride or chromium sulphates, or with chromium salts of organic acids, as for example of formic acid, acetic acid or chloracetic acid; mixtures of two or more of such chromium compounds may also be employed. In many cases certain advantages attend the use of the corresponding aminophenol ether sulphonic acids for the preparation of the azo dyestuffs forming the basis of the complex chromium compounds and their de-alkylating chroming according to the U. S. Patents Nos. 1,765,680 and 1,978,880.

By splitting off the sulphonic acid group from dyestuffs derived from coupling components containing also sulphonic acid groups, dyestuffs which are readily soluble in water or alkalies may be obtained which are suitable for dyeing wool, silk and leather and also for coloring varnish lacquers. Compared with the initial dyestuffs containing chromium, they are in many cases distinguished by considerably better fastness to washing and fulling and a better levelling power and also by a highly improved shade in artificial light. In many cases a considerable deepening or change in shade is effected by the treatment with acids. The use of coupling components free from sulphonic groups leads to dyestuffs which are almost insoluble in water and sodium carbonate solution but somewhat soluble in caustic soda solutions; they are especially valuable as pigment dyestuffs and suitable for coloring varnish lacquers.

The following examples will further illustrate how our invention may be carried out in practice but the invention is not restricted to these examples. The parts are by weight.

Example 1

An azo dyestuff containing chromium is prepared as follows:—

24.8 parts of 5-nitro-2-amino-1-methoxybenzene-4-sulphonic acid are dissolved in 300 parts of water while adding sodum carbonate solution to render the resulting solution neutral. 6.9 parts of sodium nitrite are added and the solution is allowed to flow into a mixture of 60 parts of hydrochloric acid (specific gravity 1.08) and 150 parts of ice, the resulting diazo solution being added after the course of an hour to a solution of 35 parts of 2-hydroxynaphthalene-3.6-disulphonic acid in 800 parts of water and 30 parts of calcined sodium carbonate. The dyestuff formed is filtered off by suction. A solution of 12 parts of chromium oxide (100 per cent) in 15 parts of sulphuric acid (66° Bé. strength) is added to the filter cake and the whole diluted to about 1000 parts with water. The whole is then heated in a closed vessel for an hour at 125° C., for an hour at 130° C. and finally for three hours at 135° C. The complex chromium compound formed is separated by the addition of 250 parts of sodium chloride and filtered off by suction. It dyes wool red-violet shades.

The dyestuff containing chromium is then thoroughly stirred with 1000 parts of water, 40 parts of sulphuric acid of 66° Bé. strength are added and the mixture heated at 140° C. in a closed vessel for three hours. The resulting dyestuff is separated by the addition of 200 parts of sodium chloride. It dyes wool and silk reddish blue shades.

*Example 2*

The complete chromium dyestuff derived from 5-nitro-2-amino-1-methoxybenzene-4-sulphonic acid and 1-hydroxynaphthalene-3.8-disulphonic acid in the manner described in Example 1 dyes wool reddish blue shades, but levels badly. By heating for six hours 63.8 parts of the dyestuff with 1000 parts of 4 per cent sulphuric acid at 135° C. a new dyestuff containing chromium is obtained which dyes wool green-blue shades and which levels very well.

*Example 3*

23.8 parts of 5-chlor-2-amino-1-methoxybenzene-4-sulphonic acid are stirred with 200 parts of water, 200 parts of ice and 10 parts of concentrated hydrochloric acid and diazotized by the addition of a solution of 6.9 parts of sodium nitrite in a little water. The diazo solution is coupled with a solution of 25 parts of 2-hydroxynaphthalene-6-sulphonic acid in 1000 parts of water and 30 parts of calcined sodium carbonate. By adding sodium chloride, the dyestuff is separated while stirring, filtered off by suction and a solution of 12 parts of chromium oxide (100 per cent) in 24 parts of formic acid (100 per cent) and 700 parts of water is added. The whole is heated in a closed vessel for an hour at 125° C., for an hour at 130° C. and finally for two hours at 135° C. The dyestuff is separated by the addition of 250 parts of sodium chloride and filtered off by suction.

The dyestuff containing chromium in the moist state in which it is obtained is made up to about 1000 parts with water and heated in a closed vessel for two hours at 150° C. and for another two hours at 170° C. In this treatment the residue of acid present in the moist chromium complex dyestuff from the chromating process is sufficient to initiate the splitting off of the sulfonic acid group by which a further amount of acid is set free. After stirring for several hours at room temperature, the new dyestuff separates out without the addition of salt. Both the dyestuff which has not been aftertreated and that which has been so treated dye wool bluish Bordeaux red shades but the dyestuff which has been aftertreated yields a dyeing which is considerably more fast to washing.

*Example 4*

24.8 parts of 5-nitro-2-amino-1-methoxybenzene-4-sulphonic acid are diazotized in the manner described in Example 1 and coupled with a solution of 16 parts of beta-naphthol in 200 parts of water, 9 parts of caustic soda solution (40° Bé.) and 30 parts of sodium carbonate. The dyestuff is precipitated with sodium chloride and filtered by suction. A solution of 12 parts of chromium oxide in 15 parts of sulphuric acid of 66° Bé. strength is added to the filter cake, the mixture is diluted with 800 parts of water and heated for an hour at 120° C., for an hour at 125° C., for two hours at 130° C. and for two hours at 135° C. By cooling the reaction mixture, the dyestuff separates in a well crystallized form. It is filtered off by suction and is appreciably soluble in water and readily soluble in dilute sodium carbonate solution.

900 parts of water are added to the dyestuff and then 40 parts of sulphuric acid of 66° Bé. strength; the whole is heated for three hours at 135° C. and then for three hours at 145° C. The dyestuff which has been formed is almost completely precipitated and may be directly filtered off by suction and washed with water. It is almost insoluble in water and dilute sodium carbonate solution, slightly soluble in dilute caustic alkali solutions and readily soluble in organic solvents. It dissolves in varnish lacquers giving fast reddish blue shades of color.

What we claim is:

1. In the process for the production of complex metal compounds of azo dyestuffs corresponding to the general formula

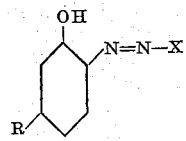

wherein X stands for the radicle of a coupling component attached to the azo group in ortho position to a hydroxy group, and wherein R stands for a member of the group consisting of halogen and the nitro group, the step which comprises heating complex metal compounds of azo dyestuffs corresponding to the general formula

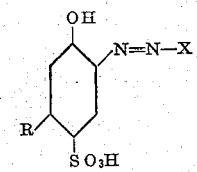

wherein X and R have the aforesaid meaning in the presence of acid reacting substances selected from the group consisting of mineral acids, strong organic acids and substances capable of supplying such acids.

2. In the process for the production of complex chromium compounds of azo dyestuffs corresponding to the general formula

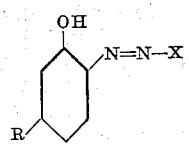

wherein X stands for the radicle of a coupling component attached to the azo group in ortho position to a hydroxy group, and wherein R stands for a member of the group consisting of halogen and the nitro group, the step which comprises heating complex chromium compounds of azo dyestuffs corresponding to the general formula

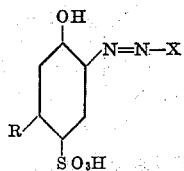

wherein X and R have the aforesaid meaning in the presence of acid reacting substances selected from the group consisting of mineral acids, strong organic acids and substances capable of supplying such acids.

3. In the process for the production of complex chromium compounds of azo dyestuffs corresponding to the general formula

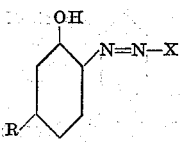

wherein X stands for the radicle of a coupling component attached to the azo group in ortho position to a hydroxy group, and wherein R stands for a member of the group consisting of halogen and the nitro group, the step which comprises heating complex chromium compounds of azo dyestuffs corresponding to the general formula

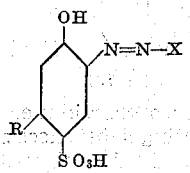

wherein X and R have the aforesaid meaning in the presence of acid reacting substances selected from the group consisting of mineral acids, strong organic acids and substances capable of supplying such acids at a temperature above 100° C.

4. In the process for the production of complex metal compounds of azo dyestuffs corresponding to the general formula

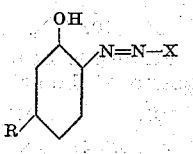

wherein X stands for the radicle of a coupling component free from sulphonic acid groups attached to the azo group in ortho-position to a hydroxy group, and wherein R stands for a member of the group consisting of halogen and the nitro group, the step which comprises heating complex metal compounds of azo dyestuffs corresponding to the general formula

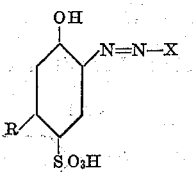

wherein X and R have the aforesaid meaning in the presence of acid reacting substances selected from the group consisting of mineral acids, strong organic acids and substances capable of supplying such acids at a temperature above 100° C.

5. In the process for the production of complex chromium compounds of azo dyestuffs corresponding to the general formula

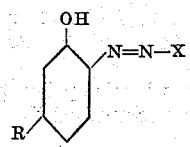

wherein X stands for the radicle of a coupling component free from sulphonic acid groups attached to the azo group in ortho-position to a hydroxy group, and wherein R stands for a member of the group consisting of halogen and the nitro group, the step which comprises heating complex chromium compounds of azo dyestuffs corresponding to the general formula

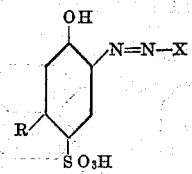

wherein X and R have the aforesaid meaning in the presence of acid reacting substances selected from the group consisting of mineral acid, strong organic acids and substances capable of supplying such acids at a temperature above 100° C.

6. In the process for the production of complex metal compounds of azo dyestuffs corresponding to the general formula

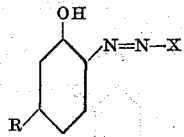

wherein X stands for the radicle of a hydroxy naphthalene attached to the azo group in ortho-position to the hydroxy group, and wherein R stands for a member of the group consisting of halogen and the nitro group, the step which comprises heating complex metal compounds of azo dyestuffs corresponding to the general formula

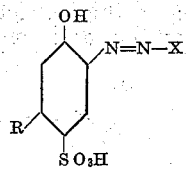

wherein X and R have the aforesaid meaning in the presence of acid reacting substances selected from the group consisting of mineral acids, strong organic acids and substances capable of supplying such acids at a temperature above 100° C.

7. In the process for the production of the complex chromium compound of the azo dyestuff

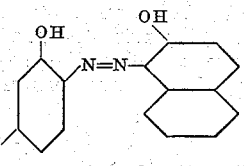

the step which comprises heating the complex chromium compound of the azo dyestuff

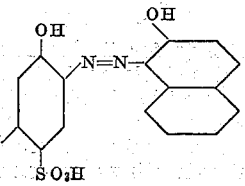

in the presence of acid reacting substances selected from the group consisting of mineral acids, strong organic acids and substances capable of supplying such acids at a temperature above 100° C.

8. In the process for the production of the complex chromium compound of the azo dyestuff

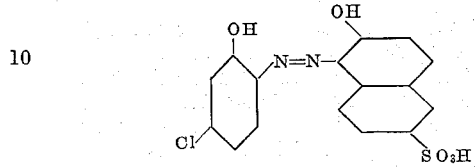

the step which comprises heating the complex chromium compound of the azo dyestuff

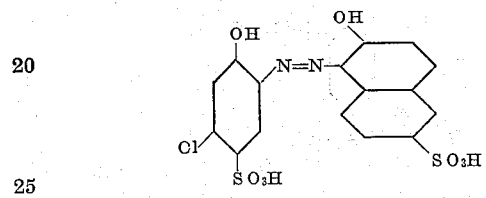

in the presence of acid reacting substances selected from the group consisting of mineral acids, strong organic acids and substances capable of supplying such acids at a temperature above 100° C.

9. In the process for the production of complex metal compounds of azo dyestuffs corresponding to the general formula

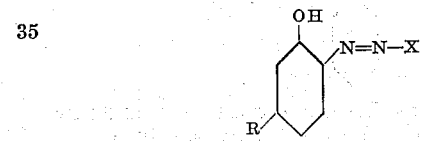

wherein X stands for the radicle of a hydroxynaphthalene disulfonic acid attached to the azo group in ortho-position to the hydroxy group, and wherein R stands for a member of the group consisting of halogen and the nitro group, the step which comprises heating complex metal compounds of azo dyestuffs corresponding to the general formula

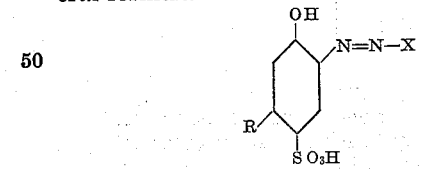

wherein X and R have the aforesaid meaning in the presence of acid reacting substances selected from the group consisting of mineral acids, strong organic acids and substances capable of supplying such acids at a temperature above 100° C.

10. In the process for the production of complex chromium compounds of azo dyestuffs corresponding to the general formula

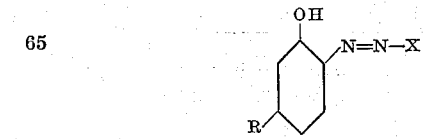

wherein X stands for the radicle of a hydroxy naphthalene disulfonic acid attached to the azo group in ortho-position to the hydroxy group, and wherein R stands for a member of the group consisting of halogen and the nitro group, the step which comprises heating complex chromium compounds of azo dyestuffs corresponding to the general formula

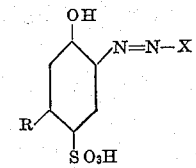

wherein X and R have the aforesaid meaning in the presence of acid reacting substances selected from the group consisting of mineral acids, strong organic acids and substances capable of supplying such acids at a temperature above 100° C.

11. In the process for the production of complex chromium compounds of azo dyestuffs of the general formula

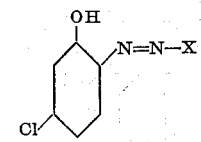

wherein X stands for the radicle of a hydroxy naphthalene disulfonic acid attached to the azo group in ortho-position to the hydroxy group, the step which comprises heating complex chromium compounds of azo dyestuffs of the general formula

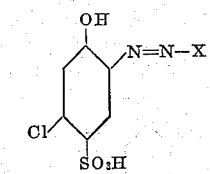

wherein X has the aforesaid meaning in the presence of acid reacting substances selected from the group consisting of mineral acid, strong organic acids and substances capable of supplying such acids at a temperature above 100° C.

12. In the process for the production of the complex chromium compounds of the azo dyestuff

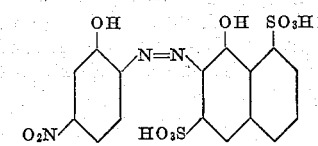

the step which comprises heating the complex chromium compound of the azo dyestuff

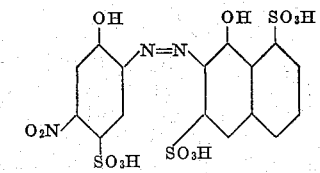

in the presence of acid reacting substances selected from the group consisting of mineral acids, strong organic acids and substances capable of supplying such acids at a temperature above 100° C.

13. The complex chromium compound of the azo dyestuff

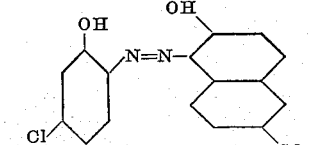

FRIEDRICH MOLL.
FRITZ LANGE.